United States Patent
Rowlands

(10) Patent No.: US 11,306,998 B2
(45) Date of Patent: Apr. 19, 2022

(54) DATA PROCESSING

(71) Applicant: BAE Systems plc, London (GB)

(72) Inventor: John Arthur Selwyn Rowlands, Warton (GB)

(*) Notice: Subject to any disclaimer, the term of this patent is extended or adjusted under 35 U.S.C. 154(b) by 711 days.

(21) Appl. No.: 16/092,271

(22) PCT Filed: Apr. 24, 2017

(86) PCT No.: PCT/GB2017/051129
§ 371 (c)(1),
(2) Date: Oct. 9, 2018

(87) PCT Pub. No.: WO2017/187143
PCT Pub. Date: Nov. 2, 2017

(65) Prior Publication Data
US 2019/0285385 A1    Sep. 19, 2019

(30) Foreign Application Priority Data

Apr. 25, 2016   (EP) ..................................... 16275064
Apr. 25, 2016   (GB) ..................................... 1607159

(51) Int. Cl.
  *F41G 7/00*   (2006.01)
  *B64D 1/04*   (2006.01)
  *F41G 9/00*   (2006.01)
  *G06F 12/06*  (2006.01)

(52) U.S. Cl.
  CPC .............. *F41G 7/007* (2013.01); *B64D 1/04* (2013.01); *F41G 9/002* (2013.01); *G06F 12/0646* (2013.01)

(58) Field of Classification Search
  None
  See application file for complete search history.

(56) References Cited

U.S. PATENT DOCUMENTS

| 2,876,401 A | 3/1959 | Fuller |
| 5,895,503 A | 4/1999 | Belgard |
| 6,345,276 B1 | 2/2002 | Lee |

(Continued)

FOREIGN PATENT DOCUMENTS

CN   104063329 A   9/2014

OTHER PUBLICATIONS

Extended European Search Report for Appl No. 16275064.0 dated Oct. 5, 2016, 10 pages.

(Continued)

*Primary Examiner* — Farley Abad
*Assistant Examiner* — Dayton Lewis-Taylor
(74) *Attorney, Agent, or Firm* — Maine Cernota & Rardin

(57) ABSTRACT

A data processing method and apparatus, the method comprising: storing, at a first memory location in a memory, a first copy of a set of data; storing, at a second memory location in a memory, a second copy of a set of data; comparing the first copy to the second copy so as to identify, within the first copy, a pointer, the pointer being located at a first data element of the first copy, the pointer specifying a second data element of the first copy; determining an offset for the identified pointer, the offset specifying a number of data elements between the first data element and the second data element; and modifying the first copy such that the pointer within the first copy specifies the second data element using only the first data element and the offset.

14 Claims, 6 Drawing Sheets

(56) References Cited

U.S. PATENT DOCUMENTS

| 6,658,980 B1 | 12/2003 | Hayes |
| 2015/0356015 A1 | 12/2015 | Sathish |
| 2015/0370703 A1 | 12/2015 | Wang |

OTHER PUBLICATIONS

Clark D et al.: Common Launch Acceptability Region Task Group, SAE World Aviation Congress—Proceedings of the 2001 Aerospace Congress, Seattle, USA, No. 2001-01-2953, Oct. 14, 2001, pp. 1-10, XP002562059.

Great Britain Search Report for Appl No. GB1607159.9 dated Sep. 20, 2016, 3 pages.

Great Britain Combined Search and Examination Report for Appl No. GB1706442.9 dated Oct. 18, 2017, 6 pages.

PCT Search Report and Written Opinion for Appl No. PCT/GB2017/051129 dated Jun. 23, 2017, 15 pages.

DATA PROCESSING

RELATED APPLICATIONS

This application is a National Phase application filed under 35 USC § 371 of PCT Application No. PCT/GB2017/051129 with an International filing date of Apr. 24, 2017, which claims priority of GB Patent Application GB1607159.9 filed Apr. 25, 2016 and EP Patent Application EP16275064.0 filed Apr. 25, 2016. Each of these applications is herein incorporated by reference in their entirety for all purposes.

FIELD OF THE INVENTION

This invention relates to data processing and more particularly to data processing involved in the integration of systems including, but not limited to, the integration of weapons on complex, highly integrated aircraft.

BACKGROUND

Integration of a weapon system with the other systems on an aircraft is a complex and lengthy task, as it affects all the major aircraft systems. Accordingly there is a requirement to improve weapon integration time and affordability.

One of the requirements of weapon integration is to enable the display of information to the aircraft pilot as to whether or not a weapon is capable of successfully engaging a particular target. For this purpose, weapons are usually grouped into two categories, weapons designed to engage targets on the ground (air to ground weapons) and weapons designed to engage targets in the air (air to air weapons). In the case of air to ground weapons, a Launch Acceptability Region (LAR) is calculated, being the region where the probability of successfully engaging or hitting a selected target is above some threshold value. The LAR is calculated in order to provide cockpit displays in the launch aircraft indicating the feasibility of successfully engaging the target, and is a function of the weapon performance characteristics, the relative positions and motions of the aircraft and the target, and often ambient conditions such as wind speed and direction.

For an air to air weapon, a Launch Success Zone (LSZ) is calculated, indicative of the probability of successfully engaging a selected air target being above some threshold value. Again the LSZ is used to provide a cockpit display indicating whether the weapon is capable of successfully engaging the target. However, calculation of an LSZ is more complicated than the calculation of an LAR because the relative speeds and directions of travel of the launch aircraft and the target are much greater, the effects of ambient conditions are greater, and also the physical properties of the weapons in flight are more significant on the calculation.

The conventional approach has been to create a simple, abstract model of the weapon, which is modified according to the launch conditions (taking into account the aircraft and target conditions (e.g. range, direction and speed of travel, etc.) and the ambient conditions). The model is used on board the aircraft to generate the LAR or LSZ for display to the pilot. A disadvantage of the conventional approach is that each model, for each different weapon type, is different. Storing the data relating to several different implicit models consumes significant storage capacity, and each model has to be comprehensively integrated to ensure that there is no adverse effect on any of the aircraft systems. Further, if there are any changes or modifications made to a weapon (such as an improvement in performance) or if it is necessary to load the aircraft with a completely new weapon, a lengthy and expensive integration process has to be conducted because the weapon model is substantially different to anything previously integrated with the aircraft systems.

SUMMARY OF THE INVENTION

In a first aspect, the present invention provides a method of processing a set of data, the data set comprising a plurality of data elements. The method comprises: providing a first copy of the set of data; providing a second copy of the set of data; comparing the first copy to the second copy so as to identify, within the first copy, a pointer, the pointer being located at a first data element of the first copy, the pointer specifying a second data element of the first copy; determining an offset for the identified pointer, the offset specifying a number of data elements between the first data element and the second data element; and modifying the first copy such that the pointer within the first copy specifies the second data element using only the first data element and the offset.

The method may further comprise: determining the set of data using a generic algorithm, the set of data being configuration data for the generic algorithm; uploading the modified first copy of the data set to an aircraft; determining, on board the aircraft, using the same generic algorithm and the uploaded modified first copy of the data set, a specific algorithm; and performing, on board the aircraft, the specific algorithm.

The step of determining the specific algorithm may comprise selecting, according to aircraft conditions, from the modified first copy of the data set, data for configuring the generic algorithm.

The generic algorithm may include a generic polynomial. The method may further comprise: providing a weapon performance envelope for a weapon; determining, using the weapon performance envelope, the set of data, the set of data including coefficients for the generic polynomial; and determining, on the aircraft, using the same generic polynomial and the coefficients specified in the uploaded modified first copy of the data set, feasibility data indicative of the feasibility of the weapon carried on the aircraft successfully engaging a target and/or the feasibility of the weapon carried on the target successfully engaging the aircraft.

The step of determining, using the weapon performance envelope, the set of data may comprise: acquiring a respective performance envelope for one or more different types of aircraft; using the one or more aircraft performance envelopes, determining a performance envelope defining the performance of all of the different aircraft types; using the weapon performance envelope and the performance envelope that is representative of the performance of all of the different aircraft types, determining a further performance envelope, the further performance envelope defining the weapon's performance when that weapon is implemented on each of the different aircraft types, the further performance envelope being the minimum envelope that defines the weapon's performance when that weapon is implemented on each of the different aircraft types; and determining the set of data, the set of data including the coefficients for the generic polynomial that fit the generic polynomial to the further performance envelope.

The method may include, using aircraft and target conditions, and the determined feasibility data, displaying, on the aircraft, a feasibility display indicative of the feasibility of a weapon carried on the aircraft successfully engaging a target and/or the feasibility of a weapon carried on the target successfully engaging the aircraft.

The specific algorithm may specify one or one or more test criteria. The method may further comprise: providing a weapon performance envelope for a weapon; determining, using the weapon performance envelope, the set of data; generating feasibility data indicative of the feasibility of the weapon carried on the aircraft successfully engaging a target and/or the feasibility of the weapon carried on the target successfully engaging the aircraft; and performing, on board the aircraft, an assessment process including determining whether or not the feasibility data satisfies the one or one or more test criteria.

The method may further comprise, based on a result of the assessment process, using the feasibility data, generating, on the aircraft, a feasibility display indicative of the feasibility of a weapon carried on the aircraft successfully engaging a target and/or the feasibility of a weapon carried on the target successfully engaging the aircraft.

The step of determining the specific algorithm may comprise selecting, from the uploaded modified first copy of the data set, data for configuring the generic algorithm in order to generate the one or more test criteria.

The step of selecting data for configuring the generic algorithm in order to generate the one or more test criteria may be performed according to aircraft and target conditions.

The specific algorithm may specify a schedule. The step of performing, on board the aircraft, the specific algorithm may comprise performing one or more processes on the aircraft in accordance with the schedule.

In a further aspect, the present invention provides apparatus for processing a set of data, the data set comprising a plurality of data elements. The apparatus comprises: a memory configured to store a first copy of the set of data and a second copy of the set of data; a comparator operatively coupled to the memory and configured to compare the first copy to the second copy so as to identify, within the first copy, a pointer, the pointer being located at a first data element of the first copy, the pointer specifying a second data element of the first copy; and one or more processors configured to determine an offset for the pointer, the offset specifying a number of data elements between the first data element and the second data element; and a data modification module configured to modify the first copy such that the pointer within the first copy specifies the second data element using only the first data element and the offset.

The apparatus may further comprise: a first generator configured to generate a database describing a weapon performance envelope; a second generator configured to generate, using the weapon performance envelope and a generic algorithm, the set of data, the set of data being configuration data for configuring the generic algorithm; and an uploader configured to upload the modified first copy of the data set to an aircraft.

In a further aspect, the present invention provides an aircraft comprising apparatus according to a preceding aspect.

In a further aspect, the present invention provides a program or plurality of programs arranged such that when executed by a computer system or one or more processors it/they cause the computer system or the one or more processors to operate in accordance with the method of any preceding aspect.

In a further aspect, the present invention provides a machine readable storage medium storing a program or at least one of the plurality of programs according to the preceding aspect.

DETAILED DESCRIPTION

Figure 1A:
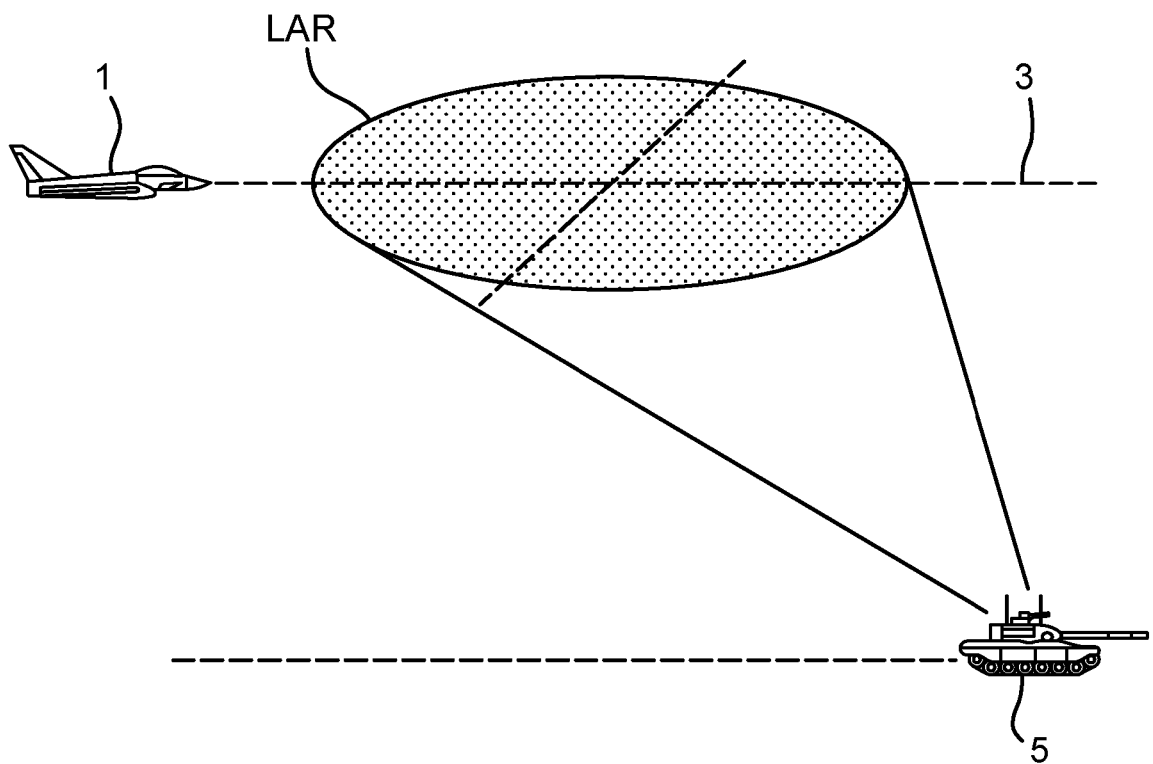
FIGS. 1a and 1b illustrate the Launch Acceptability Region (LAR) for an air to surface weapon.
Figure 1B:
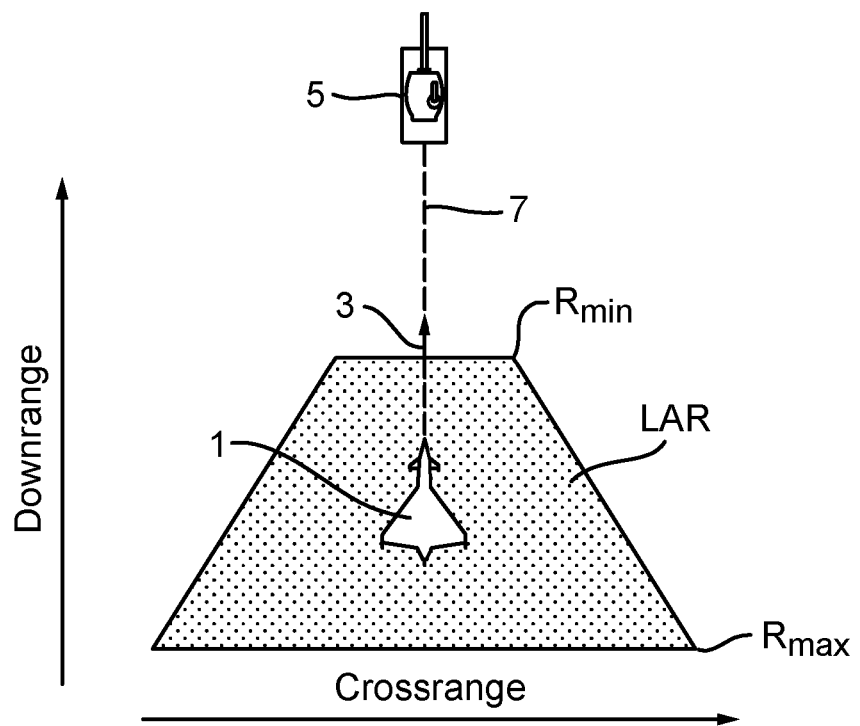

FIG. 1a shows the LAR in the plane of flight of a launch aircraft 1 flying along a flight path 3 in respect of a target 5 for an air to surface weapon (not shown) loaded on the aircraft. The LAR is calculated to provide cockpit displays in the launch aircraft 1 concerning the feasibility and firing opportunities for the situation. FIG. 1b shows the display generated for the LAR of FIG. 1a, which is in the form of a downrange and cross range display (the shaded area), where the weapon flight path 7 coincides with the aircraft flight path 3; to successfully engage the target 5 as shown in the display, the target must fall inside the shaded LAR. As the aircraft 1 moves in the downrange direction, the displayed LAR is bounded by the minimum and maximum ranges, $R_{min}$ and $R_{max}$.

In addition to the LAR for the launch aircraft 1, a Missile Engagement Zone (MEZ) for the target 5 may be determined and displayed to the pilot of the aircraft 1. This MEZ may indicate a region in which the likelihood of a ground-to-air weapon (e.g. a missile) carried by the target 5 successfully intercepting the aircraft 1 is above a threshold value.

Figure 2:
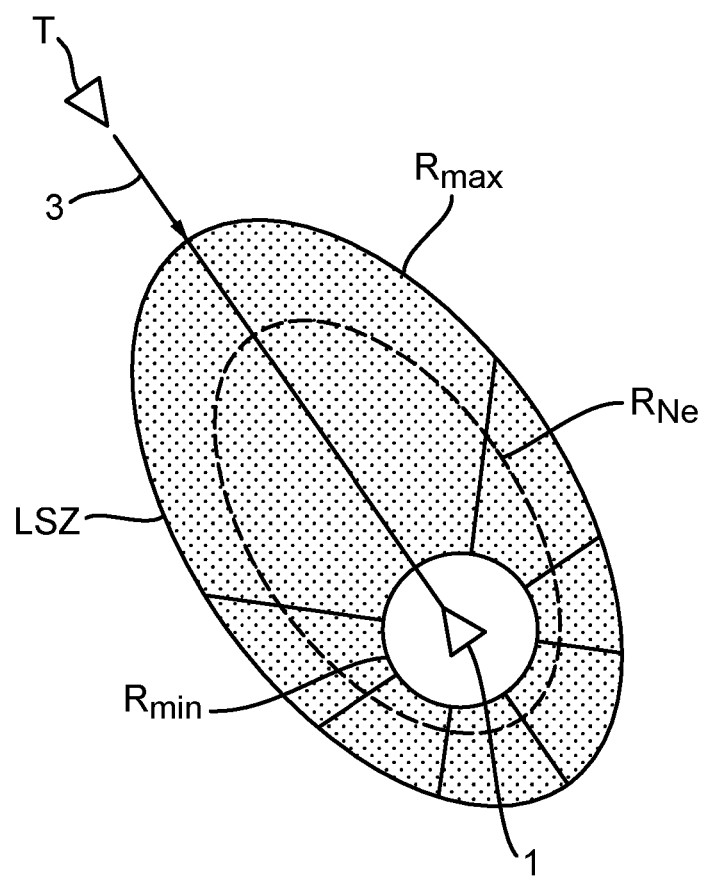
FIG. 2 illustrates the Launch Success Zone (LSZ) for an air to air weapon.

The LSZ shown in FIG. 2 is the region where the probability of an air to air weapon hitting an airborne target T is above a threshold level. Calculation of the LSZ tends to be more complicated than for the LAR, because a greater number of factors are involved, such as the relative velocities and directions of travel of the launch aircraft and the target, and those of the weapon relative to the target. Also, the shape of the LSZ tends to be more complex than that of the LAR; as with the LAR, there are maximum and minimum ranges, $R_{max}$ and $R_{min}$, between which the target T can be successfully engaged, but there is a zone bounded by $R_{min}$ within which the Target T cannot be engaged successfully because it is outside the capability of the weapon to manoeuvre and hit the target when the launch aircraft is so close to the target, given the speeds and directions of travel of the launch aircraft and the target T.

In this embodiment, the LSZ further includes a so-called "no escape range" $R_{Ne}$. The zone bounded by $R_{Ne}$ and $R_{min}$ is a zone in which the likelihood of the Target T successfully evading the weapon is below a threshold likelihood. This range may be determined using performance parameters of the weapon, the launch aircraft 1, and the target T.

As is known in the art, there are two LSZs, one for the launch aircraft to engage the target 7 and the other for the target to engage the launch aircraft.

It is often a requirement to calculate the LAR or LSZ for an engagement to display to the crew of the launch aircraft information regarding the feasibility, or likelihood of success, of the engagement, and to aid fire control and steering decisions. The traditional approach has been to create a simple, abstract model of the weapon that has parameters defined by the launch conditions; this model is then used on board the launch aircraft to generate the LAR, LSZ, or MEZ and the appropriate display.

Figure 3:
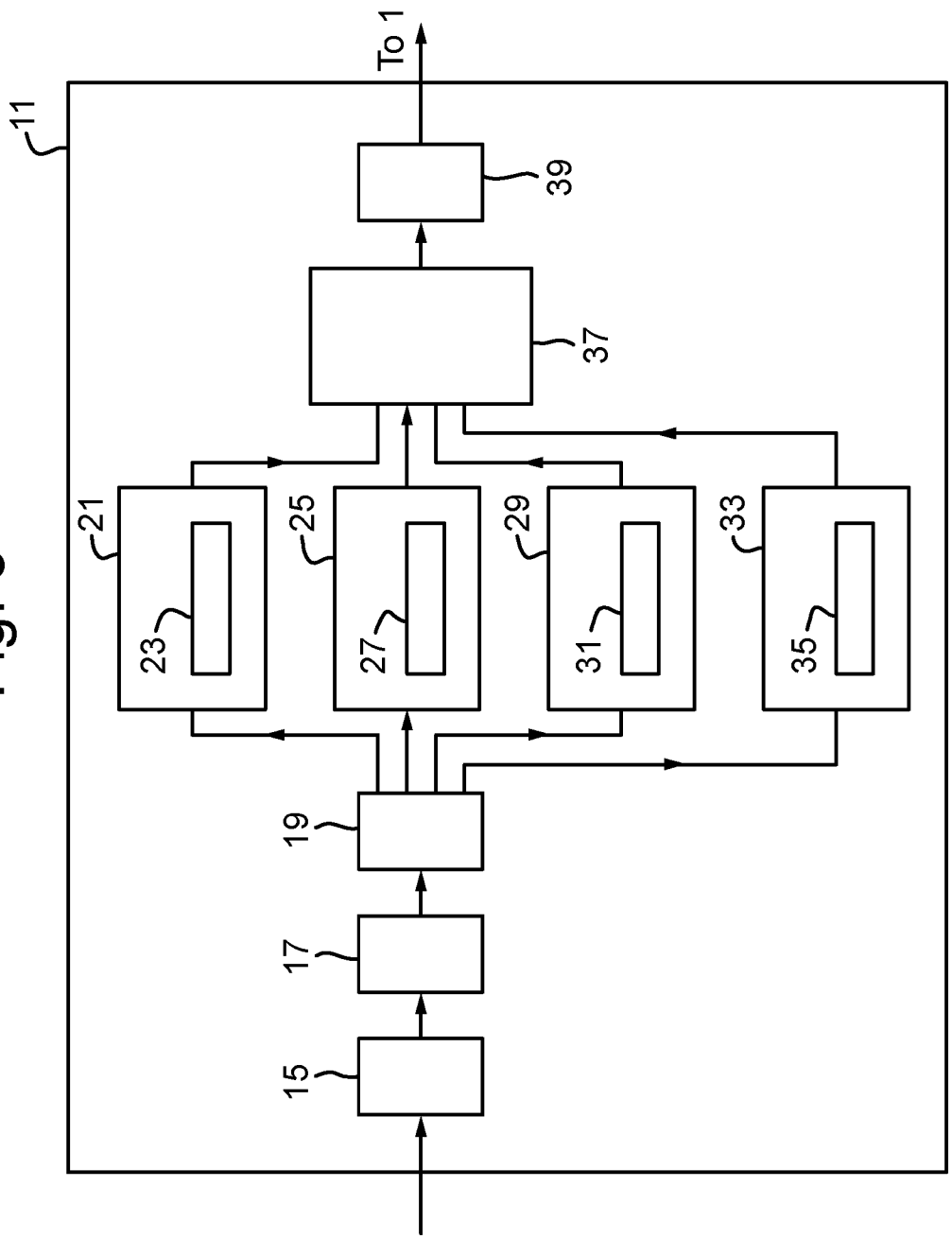
FIG. 3 is a schematic illustration (not to scale) showing a ground system used for calculating the LAR or LSZ.

FIG. 3 is a schematic illustration (not to scale) showing an embodiment of a first part of a system for calculating the LAR, LSZ, or MEZ. The first part of the system, hereinafter referred to the "ground system" and indicated using the reference numeral 11, includes processing modules which are, in this embodiment, located on the ground. A second part of the system for calculating the LAR or LSZ, which includes processing modules located on the launch aircraft 1, is described in more detail later below with reference to FIG. 6.

The first part of a system for calculating the LAR or LSZ 11 comprises a data space generator 15 configured to generate the data space, which is the range of conditions over which the weapon performance envelope is to be defined. Generation of the data space depends on the ranges of conditions: for which it is required to fire the weapon (which is defined by the weapon user/operator); for which it is feasible to fire according to the launch aircraft capability, and for which it is feasible to fire according to the weapon capability/performance.

In this embodiment, the data space generator 15 comprises data which describes performance parameters for each of a plurality of different aircraft types. Different types of aircraft may have different capabilities from one another, thus, for example, aircraft having the same or similar capabilities may be regarded as being the same "aircraft type". Different types of aircraft may be different models or makes of aircraft and/or may have different manufacturers. Different types of aircraft may have different operational parameters (maximum speed, maximum altitude, g limit, etc.). Different types of aircraft may be configured for different purposes or function (e.g. bombers, fighters, refueling etc.). These aircraft performance envelopes may be supplied by the aircraft manufacturers or through testing. The plurality of different aircraft types includes the type of the launch aircraft 1 and, preferably, the target aircraft T. The performance parameters for each of the aircraft types may include, but are not limited to, a maximum achievable altitude, a maximum achievable g-force, and a maximum achievable climb angle. The values of the performance parameters for different types of aircraft may be different from one another. For example, a first type of aircraft may have a maximum altitude of 45,000 ft whereas a second type of aircraft may have a maximum altitude of 55,000 ft, and so on.

In this embodiment, the data space generator 15 further comprises data which describes performance parameters for each of a plurality of different weapon types, e.g. different weapons that may be loaded onto to the launch aircraft or may be expected to be carried by a hostile target. These weapon performance envelopes may be supplied by the weapon manufacturers or through testing. The plurality of different weapon types includes the type of the weapon that is carried by the launch aircraft 1 and, preferably, the target. The performance parameters for each of the weapon types may include, but are not limited to, a maximum altitude at which the weapon may be released, a maximum g-force at which the weapon may be released, and release mechanism of the weapon. The values of the performance parameters for different types of weapon may be different from one another. For example, a first type of weapon may be able to be released up to an altitude of 35,000 ft, whereas a second type of weapon may be able to be released up to an altitude of 45,000 ft, and so on.

The data space generator 15 may define the release, weather and commanded impact conditions for training and verification sets which are run by a truth data generator 17.

The data space generator 15 is operatively coupled to the truth data generator 17 such that the truth data generator 17 may receive an output of the data space generator 15.

The truth data generator 17 determines the weapon performance for each firing case in the data space; this depends on the weapon performance model which is usually provided by the weapon manufacturer.

In this embodiment, for each type of weapon, a further weapon performance envelope is determined as follows.

Firstly, a "maximum aircraft performance envelope" is determined using the maximum performance envelope limits across all aircraft types. In other words, for each of the aircraft performance parameters, an envelope for that performance parameter that covers the performance, with respect to that performance, across all the different aircraft types is determined. For example, if, across all aircraft types, the maximum achievable altitude is 55,000 ft, then the maximum aircraft performance envelope has, for the maximum altitude performance parameter, an envelope specifying 0ft to 55,000 ft (similarly for the other aircraft performance parameters).

In this embodiment the maximum aircraft performance envelope may be expressed as:

$$A=(A_1, A_2, \ldots, A_N)$$

where $$A_i=[(a_{ij})_{min}, (a_{ij})_{max}]$$

where: $i=1, \ldots, N$ is an index for the aircraft performance parameters, N being the number of aircraft performance parameters;

$j=1, \ldots, M$ is an index for the types of aircraft, M being the number of different aircraft types; and $a_{ij}$ is the envelope of the ith aircraft performance parameter of the jth aircraft type, $(a_{ij})_{min}$ being the minimum (over all aircraft types j) of the lower bounds of all envelopes $a_{ij}$, and $(a_{ij})_{max}$ being the maximum (over all aircraft types j) of the upper bounds of all envelopes $a_{ij}$.

The aircraft performance envelope A covers at least the performance envelopes of each of the different types of aircraft.

Secondly, for each weapon type, an "updated" or "further" weapon performance envelope is determined using the initial weapon performance envelope of that weapon type (provided by the weapon supplier and stored in the data space generator 15) and the maximum aircraft performance envelope A. In this embodiment, the further weapon performance envelope for a particular weapon type is the minimum performance envelope (i.e. smallest range of parameter values) that specifies the performance of a weapon of that weapon type being launched from each of the different aircraft types. In this embodiment, for a particular performance parameter, the envelope of that performance parameter as specified in the further weapon performance envelope for a particular weapon type is the minimum performance envelope of that performance parameter specified by the initial weapon performance envelope of that weapon type and the maximum aircraft performance envelope A. For example, for a given weapon type, if the maximum achievable altitude across all the aircraft types is 55,000 ft but the maximum altitude from which that weapon may be released is only 45,000 ft, then the further weapon performance envelope specifies an envelope specifying of 0ft to 45,000 ft in which that weapon is releasable (similarly for the other aircraft performance parameters).

In this embodiment the further weapon performance envelope for the kth weapon type may be expressed as:

$$W_k = (W_{k1}, W_{k2}, \ldots, W_{kL})$$

Where $$W_{kl} = [\max((a_{lj})_{min}, w_{kl,lower}), \min((a_{lj})_{max}, w_{kl,upper})]$$

where: l=1, . . . , L is an index for the weapon performance parameters, L being the number of weapon performance parameters;

k=1, . . . , K is an index for the types of weapon, K being the number of different weapon types; and $w_{kl,lower}$ and $w_{kl,upper}$ are the lower and upper bounds respectively of the envelope of the lth weapon performance parameter of the kth weapon type.

Thus, the further weapon performance envelope specifies, for a given weapon type, the performance of that weapon when carried by any of the different aircraft types.

The product of the truth data generator 17 is output to, and stored in a truth database 19. The product of the truth data generator 17 which is stored in the truth database 19 is a set of data specifying, for each weapon type, the further weapon performance envelope for each of a plurality of exemplary weapon firings. The truth data generator 17 may produce the training and verification sets which are used by one or more configuration data generators. In this embodiment, the configuration data generators include a coefficient generator 21, a look-up table data generator 25, a LAR/LSZ check data generator 29, and an output manager data generator 33.

Conventionally, the truth database 19 is used as a model which can be employed on board the launch aircraft 1 in order to generate the feasibility of engagement displays (LAR or LSZ, as appropriate).

In this embodiment, the coefficient generator 21 receives the further weapon performance envelopes stored by the truth database 19 and calculates, for each weapon type and for each example weapon firing, configuration data for a generic LAR/LSZ algorithm 23. In this embodiment, as described in more detail later below, the generic LAR/LSZ algorithm 23 comprises one or more generic polynomials, for example, a generic polynomial for each output parameter that is to be determined to specify an LAR/LSZ (e.g. a generic polynomial for each of $R_{max}$, $R_{min}$, and $R_{Ne}$, etc.). The configuration data for the generic LAR/LSZ algorithm 23 includes coefficients for each generic polynomial that "fit" that generic polynomial to the further weapon performance envelope shape. An example method of determining coefficient values that fit a generic polynomial to the further weapon performance envelope of a particular weapon type and particular example weapon firing is described in more detail later below.

In some embodiments, the coefficient generator 21 may generate coefficients by building training and verification footprints (representing the target engagement envelope) from data extracted from the truth database, by fitting a geometric shape to the training footprint and by defining the coefficients for the generic LAR/LSZ algorithm 23. The coefficient generator 21 may then verify the coefficients against the verification sets by creating footprints based on the coefficients at the verification set conditions and by confirming that these verification footprints meet the criteria for successful engagement.

Figure 4:
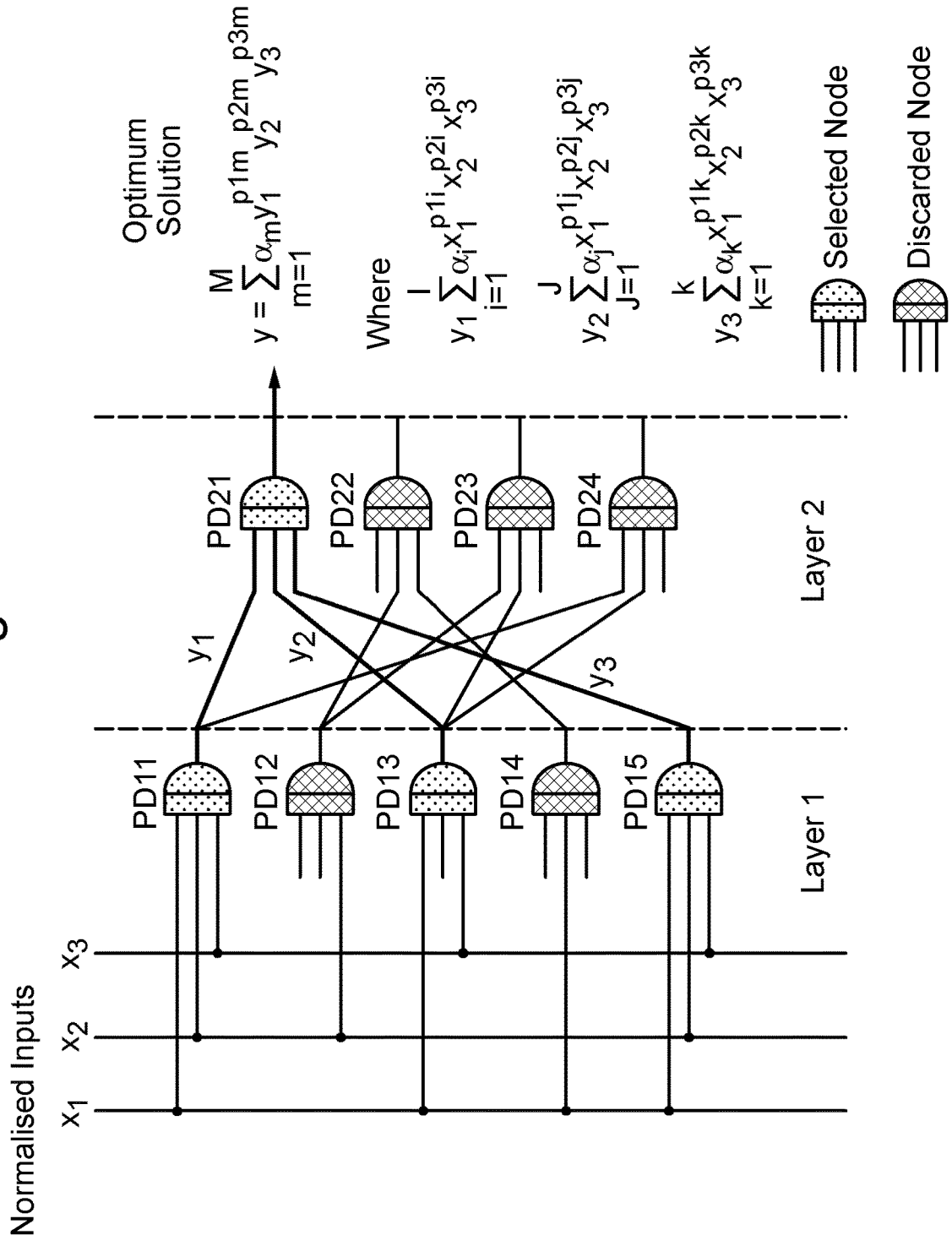
FIG. 4 is a schematic diagram illustrating an embodiment of a coefficient generator technique.

In other embodiments, an alternative method of coefficient generation is used as illustrated in FIG. 4. The number of inputs and the form of each polynomial descriptor, $PD^{Layer, Node}$, are determined by an optimisation method known as the Genetic Algorithm.

What will now be described is a method of determining coefficient values that fit a generic polynomial of the generic LAR/LSZ algorithm 23 to the further weapon performance envelope of a particular weapon type and particular example weapon firing. It will be appreciated that in reality, a set of coefficients is determined for each of the weapon types for each of the example weapon firings.

In this method the coefficient generator 21 starts by creating an initial set of candidate polynomials whose variables are some or all of the weapon or aircraft firing condition parameters. Each of the candidate polynomials is a unique solution of the fitting problem. Some or all of the candidate polynomials may have different order, or dimension, from some or all of the other candidate polynomials. For each candidate polynomial, a set of coefficients is then computed that best "fit" that candidate polynomial to the further weapon performance envelope. This may be done using a criterion of least square error or any other fitting method. For each candidate polynomial, a "score" indicative of the quality of this fit is then computed.

The Genetic Algorithm is then applied to the candidate polynomials and scores. In this embodiment, the best scoring polynomials are retained and the other (i.e. worst scoring) polynomials are rejected. New candidate polynomials that have similar features to the retained candidate polynomials are then created to replace the rejected ones (e.g. by "breeding" the retained candidate polynomials). A set of coefficients and score values are then calculated for this new generation of candidates, and so on.

The Genetic Algorithm is repeated until improvement in the scores of the best candidates ceases or some other criteria are satisfied. The result is the first layer, Layer 1, of a Self-Organising Polynomial Neural Network (SOPNN).

The whole process is then repeated with the outputs of the first layer providing the inputs to create a second layer, Layer 2, of the SOPNN. The new layer has the effect of creating higher-order candidate polynomials and coefficients for consideration. The selection of polynomials in the new layer is again governed and optimised by the Genetic Algorithm.

Layers are added to the SOPNN in this way until improvement in the scores of the best candidates ceases or some other criteria are satisfied. A completed network comprising two layers is represented in FIG. 4. The final network is obtained recursively from the path ending at the output node with the best score in the final generation of candidates (the "Optimum Solution"). Any node with no connection to this path is discarded as shown in FIG. 4, where nodes which contribute to the optimal solution are lightly shaded and discarded nodes are black.

The best single candidate polynomial and coefficient set is identified and stored. This process is repeated until all the required characteristics of the LAR/LSZ have corresponding polynomial models. In other words, the process is repeated until, for each firing condition, and for each weapon type, a polynomial model fitted to the further weapon performance envelope for that weapon type and firing condition is generated.

The generic polynomials of the generic LAR/LSZ algorithm 23 are predetermined, and in the present invention are a polynomial equations of the form:

$$y_n = \sum_{m=1}^{M_n} \alpha_{mn} x_1^{P1mn} x_2^{P2mn} \ldots$$

Where:

$\alpha_{mn}$ represent the m coefficients required to compute output n;

$\{x_1 \ldots x_{Ni}\}$ represent the normalised inputs; and $\{y_1 \ldots y_{Nj}\}$ represent the outputs.

Preferably, the order of each generic polynomial is three or greater. More preferably, the order of each generic polynomial is between 10 and 25. More preferably, the order of each generic polynomial is 20. Surprisingly, it has been found that using generic polynomials with orders of around 20 adequately describes most air-to-air engagements accurately in an appropriate runtime for on-aircraft implementation. Nevertheless, the generic polynomials may have orders greater than 2.

Referring again to FIG. 3, the output of the coefficient generator 21 is configuration data for the generic LAR/LSZ algorithm 23 comprising the determined set of coefficients. The coefficient generator 21 sends the set of coefficients to a configuration data test module 37.

In this embodiment, the look-up table data generator 25 receives the further weapon performance envelopes stored by the truth database 19 and calculates, for each weapon type and for each example weapon firing, configuration data for a generic look-up table algorithm 27. The configuration data for the generic look-up table algorithm 27 comprises data that specifies a configuration for the generic look-up table algorithm 27, thereby specifying a specific look-up table algorithm. The configuration data for the generic look-up table algorithm 27 may include a set of input values to the generic look-up table algorithm 27. In this embodiment, the generic look-up table algorithm 27 comprises one or more look-up tables. The configuration data for the generic look-up table algorithm 27 may include, for example, data that specifies, for each weapon type and for each example weapon firing, which look-up table or tables of the generic look-up table algorithm 27 are to be used for that weapon and firing, and/or an order in which multiple look-up tables should be used for that weapon and firing.

In some embodiments, the configuration data for the generic look-up table algorithm 27 is typically a subset of the truth data points in database 19. The generic look-up table algorithm 27 may, for example, be used in circumstances where there are a limited number of elements of the performance envelope affecting the output. Such circumstances would tend not to merit the complexity of a more powerful algorithm such as a polynomial. A typical usage would be for calculation of the maximum throw of the weapon under current conditions, which does not depend on any of the target characteristics. Preferably, the lookup table operates by interpolating between tabulated data points. Preferably, the generic algorithm operates independently of the number of inputs or the number of tabulated values, this latter information forming part of the configuration data.

The output of the look-up table data generator 25, i.e. the configuration data for the generic look-up table algorithm 27, is sent, by the look-up table data generator 25, to the configuration data test module 37.

In this embodiment, the LAR/LSZ check data generator 29 receives the further weapon performance envelopes stored by the truth database 19 and calculates, for each weapon type and for each example weapon firing, configuration data for a generic LAR/LSZ check algorithm 31. The configuration data for the LAR/LSZ check data generator 29 comprises data that specifies a configuration for the generic LAR/LSZ check algorithm 31, thereby specifying a specific LAR/LSZ check algorithm. The configuration data for the generic LAR/LSZ check algorithm 31 may include a set of input values to the generic LAR/LSZ check algorithm 31. In this embodiment, the generic LAR/LSZ check algorithm 31 comprises one or more rules (e.g. IF-THEN rules) and or test criteria against which a determined LAR/LSZ may be assessed. The generic LAR/LSZ check algorithm 31 may specify one or more actions that are to be performed if a particular rules or test criterion is not satisfied. Examples of appropriate rules that may be included in the generic LAR/LSZ check algorithm 31 include, but are not limited to:

IF $R_{max} < R_{min}$ THEN set $R_{max} = R_{min}$;
IF $R_{Ne} < R_{min}$ THEN set $R_{Ne} = R_{min}$;
IF $R_{max} < R_{Ne}$ THEN set $R_{max} = R_{Ne}$;
IF $R_{min} < C_1$ THEN set $R_{min} = C_1$;
IF $R_{max} > C_2$ THEN set $R_{max} = C_2$;

where $C_1$ is some predetermined minimum distance from the aircraft 1, and where $C_2$ is a predetermined maximum weapon range from the aircraft 1.

The configuration data for the generic LAR/LSZ check algorithm 31 may include, for example, data that specifies, for each weapon type and for each example weapon firing, which of the rules or test criteria of the generic LAR/LSZ check algorithm 31 are to be used for that weapon and firing, and/or an order in which multiple rules and/or test criteria should be applied for that weapon and firing.

Also for example, in some cases the system is to calculate an optimal aircraft bearing for using the weapon, and a suitable steering cue may be provided to the pilot. In such cases, an example check rule that may be used is: IF optimal steering<delta THEN $R_{max} = R_{opt}$.

Preferably, the algorithm allows any number of appropriate checks to be performed, which may depend on the specific requirements of the weapon and the operator.

The output of the LAR/LSZ check data generator 29, i.e. the configuration data for the generic LAR/LSZ check algorithm 31, is sent, by the LAR/LSZ check data generator 29, to the configuration data test module 37.

In this embodiment, the output manager data generator 33 receives the further weapon performance envelopes stored by the truth database 19 and calculates, for each weapon type and for each example weapon firing, configuration data for a generic output manager algorithm 35. The configuration data for the generic output manager algorithm 35 comprises data that specifies a configuration for the generic output manager algorithm 35, thereby specifying a specific output manager algorithm. In this embodiment, the generic output manager algorithm 35 comprises one or more different schedules. Each schedule specifies one or more of the other generic algorithms (i.e. the generic LAR/LSZ algorithm 23, the generic look-up table algorithm 27, and the generic LAR/LSZ check algorithm 31) and an order for those specified generic algorithms. The configuration data for the generic output manager algorithm 35 may include, for example, data that specifies, for each weapon type and for each example weapon firing, a specific schedule (i.e. which generic algorithms are to be implemented, and in which order) for that weapon and firing. Preferably, the schedule also defines how the outputs from each generic algorithm are used as inputs to other algorithms later in the schedule.

The output of the output manager data generator 33, i.e. the configuration data for the generic output manager algorithm 35, is sent, by the output manager data generator 33, to the configuration data test module 37.

In this embodiment, the configuration data test module 37 receives configuration data from each of the configuration data generation modules 21, 25, 29, 33. The configuration data test module 37 processes each set of received configuration data to ensure that that configuration data is well-defined irrespective of a memory address at which that configuration data is stored. In this embodiment, the test module 37 transforms the configuration data to ensure this property of re-locatability. Furthermore, the configuration data test module 37 may, for each set of configuration data, modify that configuration data set to provide that that configuration data is fully defined irrespective of a memory address at which that configuration data is stored. The configuration data test module 37 and the process performed by the configuration data test module 37 is described in more detail later below with reference to FIG. 5.

The configuration data test module 37 sends its output (i.e. the well-defined configuration data sets) to the data uploader 39.

The data uploader 39 loads the configuration data received from the configuration data test module 37 onto the launch aircraft. The processes performed on the launch aircraft 1 will be described in more detail later below with reference to FIG. 6.

Figure 5:
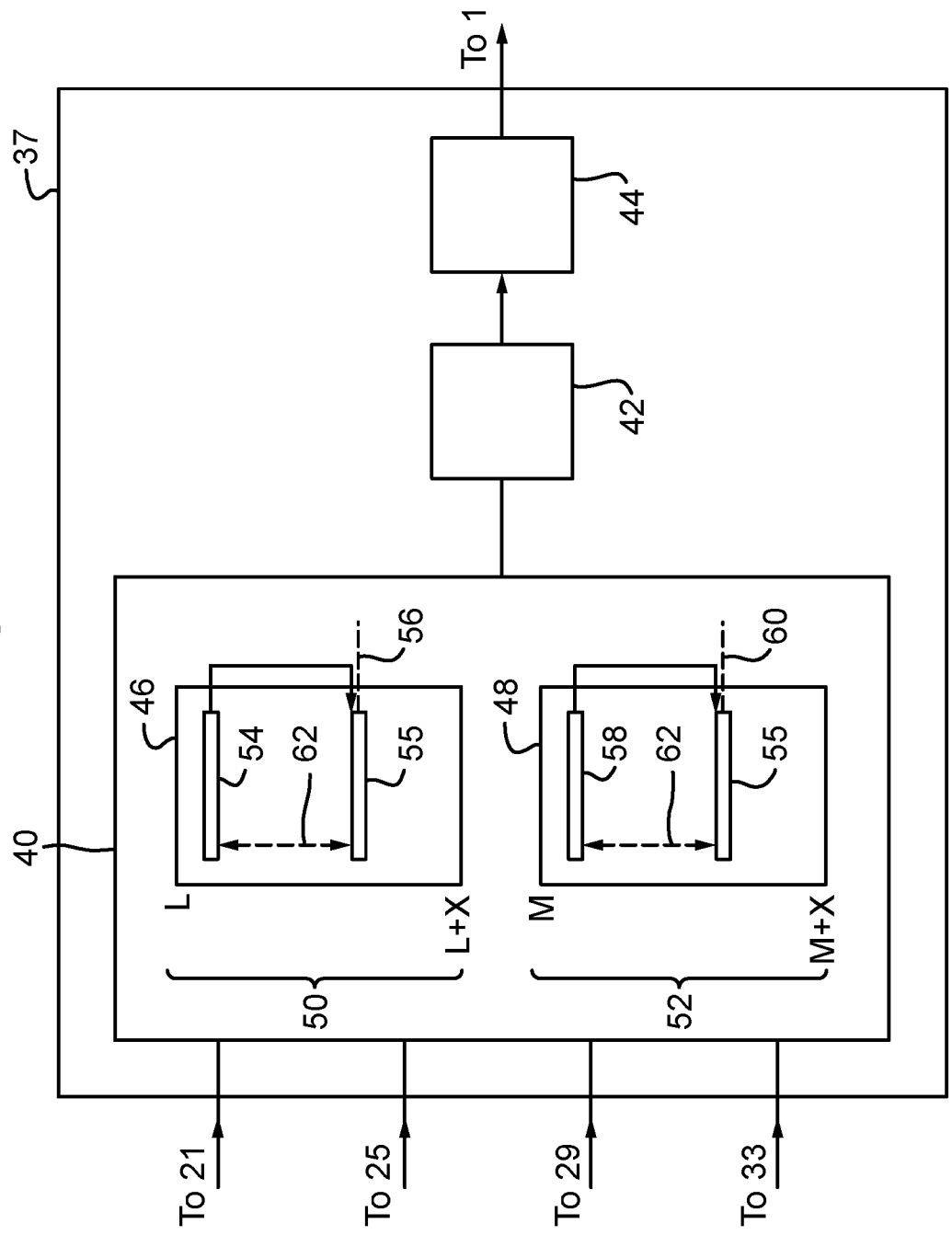
FIG. 5 is a schematic illustration (not to scale) showing a schematic illustration of a configuration data test module.

FIG. 5 is a schematic illustration (not to scale) showing a schematic illustration of the configuration data test module 37.

In this embodiment, the configuration data test module 37 comprises a memory 40, a comparator 42, and a data modification module 44.

The memory 40 is coupled to each of the configuration data generators 21, 25, 29, 33 such that configuration data generated by the configuration data generators 21, 25, 25, 33 may be stored in the memory 40. The memory 40 is further coupled to the comparator 42 such, in operation, that data stored in the memory 40 may be accessed and retrieved by the comparator 42. The comparator 42 is further coupled to the data modification module 44 such that, in operation, an output of the comparator 42 is sent to the data modification module 44. The data modification module 44 is further coupled to the data uploader 39 such that, in operation, an output of the data modification module 44 is sent to the data uploader 39.

In this embodiment, the configuration data test module 37 processes a received set of configuration data as follows. Although the processing of only a single set of configuration data for a single generic algorithm is described below, it will be appreciated by the skilled person that the configuration data test module 37 may process multiple sets of configuration data (e.g. each set of configuration data) either in series or in parallel.

Firstly, the memory 40 receives the configuration data and stores two copies of that configuration data, hereinafter referred to as the "first configuration data copy" and the "second configuration data copy" and indicated in the Figures by the reference numerals 46 and 48 respectively.

In this embodiment, the first configuration data copy 46 is stored in the memory 40 at a first memory location 50. The first memory location 50 includes memory address lines L to L+X inclusively, i.e. the lines of data that make up the first configuration data copy 46 occupy memory address lines L to L+X inclusively of the memory 40.

In this embodiment, the second configuration data copy 48 is stored in the memory 40 at a second memory location 52. The second memory location 52 includes memory address lines M to M+X inclusively, i.e. the lines of data that make up the second configuration data copy 48 occupy memory address lines M to M+X inclusively of the memory 40.

In this embodiment, a line of the configuration data 46, 48 comprises a pointer that points (i.e. refers to or specifies) one or more other lines of that configuration data. In particular, the first configuration data copy 46 comprises a first pointer 54 that points (as indicated in FIG. 5 by a solid arrow) to a data value 55 located at a first memory address 56, the first memory address 56 being within the first configuration data copy 46. Thus, as the second configuration data copy 48 is a copy of the first configuration data copy 46, the second configuration data copy 48 comprises a second pointer 58 that points to the data value 55 located at a second memory address 60, the second memory address 60 being within the second configuration data copy 48.

In some embodiments, the configuration data 46, 48 comprises multiple pointers.

In some embodiments, the configuration data 46, 48 may include a different type of pointer instead of or in addition to pointer that points to a data value, for example, a function pointer that points to executable code within that configuration data 46, 48.

After the two copies of the configuration data 46, 48 have been stored in the memory 40, the comparator 42 accesses the memory 40 and compares the first configuration data copy 46 to the second configuration data copy 48. In this embodiment, the second configuration data copy 48 is a copy of the first configuration data copy 46, thus the only differences between the first configuration data copy 46 to the second configuration data copy 48 are the first and second pointers 54, 58. The first pointer 54 is different to the second pointer 58 because the first pointer 54 refers to the first memory address 56, while the second pointer 58 refers to the second memory address 60. The first memory address 56 is different to the second memory address 60.

Thus, by comparing the two copies of the configuration data 46, 48, the comparator 42 is able to identify the pointers 56, 58 within that configuration data.

The first pointer 54 points to the first memory address 56 within the first configuration data copy 46. A distance between the memory location of the first pointer 56 and the first memory address 56 is hereinafter referred to as the "offset" and is indicated in FIG. 5 by a double-headed dotted arrow and the reference numeral 62. The second pointer 58 points to the second memory address 58 within the second configuration data copy 48. The distance between the memory location of the second pointer 58 and the second memory address 60 is equal to the offset 62.

For each identified pointer in a copy of the configuration data, the comparator 42 may determine a value for the offset corresponding to that pointer, i.e. a distance between the memory address of that pointer and the memory address referred to by that pointer. In this embodiment, the comparator 42 determines, for the first pointer 54, the value of the offset 62 for that pointer 54.

After processing the configuration data stored in the memory 40, the comparator 42 subsequently sends, to the data modification module 44, the first configuration data copy 46, the locations within the first configuration data copy 46 of all identified pointers in the first configuration data copy 46, and, for each of those identified pointers, the offset determined for that pointer. Thus in this embodiment, the comparator 42 sends, to the data modification module 44, the first configuration data copy 46, the location within the first configuration data copy 46 of the first pointer 54, and the offset 62.

The data modification module 44 processes the data received from the comparator 42 by modifying each of the identified pointers in the received configuration data 46 using the offset corresponding to that pointer. Thus, the first pointer 54 is modified using the offset 62. In particular, the first pointer 54 is modified such that the data value 55 is specified using the memory location of the first pointer 54 and the offset 62. The first pointer 54 may be modified such that it specifies the data value 55 using only the memory location of the first pointer 54 and the offset 62. Thus, the first pointer 54 may be changed from specifying the data value 55 using a line address of the data value 55, to specifying the data value 55 using the line address of the first pointer 54 and the offset 62. Thus, advantageously, the first configuration data copy 46 is modified such that each pointer of that configuration data is well-defined (i.e. internally consistent) independently of a memory location at which that configuration data is stored.

After processing the received data from the comparator 42, the data modification module 44 sends to modified configuration data to the data uploader 39. After sending the modified configuration data to the data uploader 39, the data modification module 44 may discard the information that specifies the locations of pointers in the configuration data and the corresponding offsets.

Thus, the configuration data test module 37 and the process performed thereby are provided.

Figure 6:
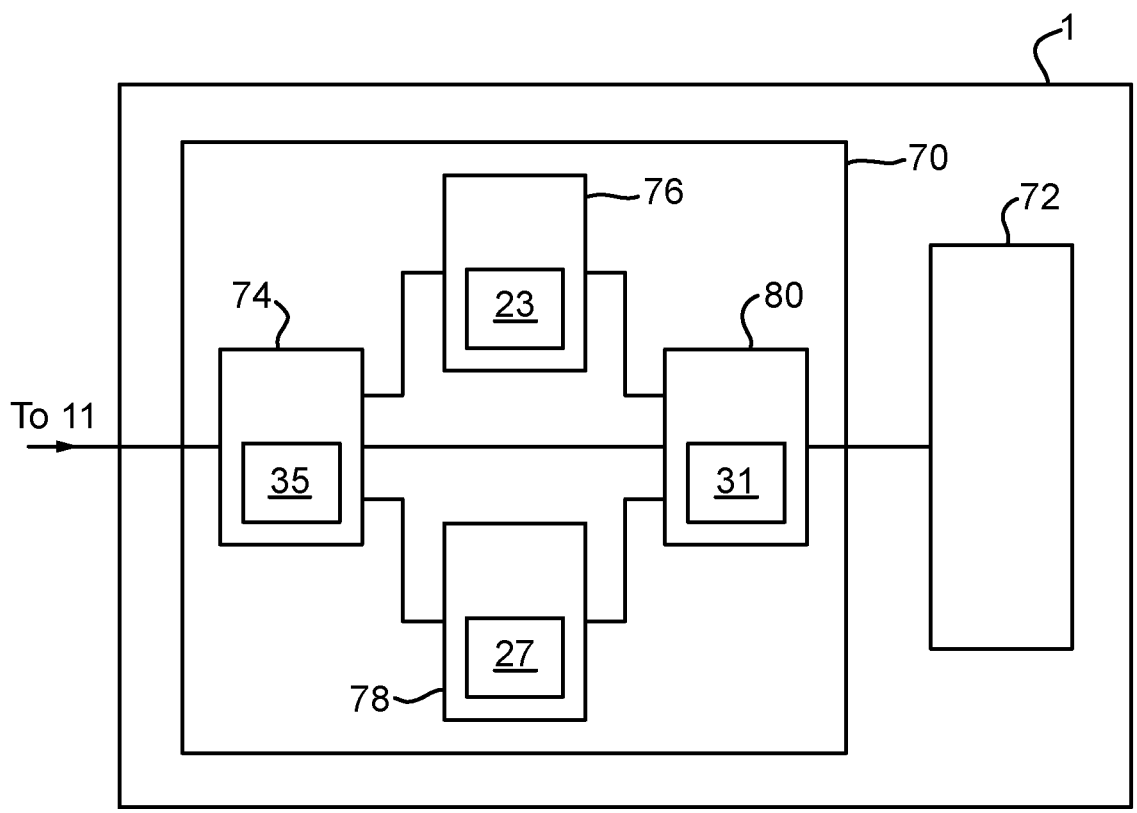
FIG. 6 is a schematic illustration (not to scale) showing further details of the launch aircraft, and illustrating process performed on board the launch aircraft.

FIG. 6 is a schematic illustration (not to scale) showing further details of the launch aircraft 1, and illustrating process performed on board the launch aircraft 1.

In this embodiment, the launch aircraft 1 comprises a reconstructor 70 and a display 72. The reconstructor 70 is configured to receive the modified sets of configuration data sent to the launch aircraft 1 by the data uploader 39. The reconstructor 70 is further coupled to the display 72 such that an output of the reconstructor 70, such as a reconstructed LAR, LSZ, or MEZ, may be displayed to the pilot of the launch aircraft 1 by the display 72.

In this embodiment, the reconstructor 70 comprises an output manager 74, an LAR/LSZ generation module 76, a look-up table module 78, and a LAR/LSZ check module 80.

The output manager 74 comprises the same generic output manager algorithm 35 as the output manager data generator 33. The output manager 74 receives the modified sets of configuration data sent to the aircraft 1 by the data uploader 39. The output manager 74 then brings together the generic output manager algorithm 35 with the received modified configuration data for the generic output manager algorithm 35 so as to reconstruct the schedule specified by that configuration data for a particular engagement by selecting the appropriate algorithm and parameters for the current launch conditions (i.e. the weapon or aircraft firing conditions). The schedule reconstructed by the output manager 74 may specify, for each weapon type and for each example weapon firing, which generic algorithms are to be implemented, and in which order, for that weapon and firing. After reconstructing the schedule, the output manager 74 distributes the other received modified configuration data sets (i.e. configuration data for the other generic algorithms 23, 27, 31) to the LAR/LSZ generation module 76, the look-up table module 78, and the LAR/LSZ check module 80 in accordance with the reconstructed schedule.

The LAR/LSZ generation module 76 comprises the same generic LAR/LSZ algorithm 23 as the coefficient generator 21. In this embodiment, the LAR/LSZ generation module 76 receives the modified configuration data for the generic LAR/LSZ algorithm 23 from the output manager 74. The LAR/LSZ generation module 76 brings together the generic LAR/LSZ algorithm 23 and the uploaded coefficients, so as to reconstruct the LAR, LSZ, or MEZ for a particular engagement by selecting the appropriate algorithm and parameters for the current launch conditions (i.e. the weapon or aircraft firing conditions/parameters). The weapon or aircraft firing condition parameters may include, but are not limited to, parameters such as aircraft velocities, aircraft height, aircraft attitude, slant range to target, target velocities, target height, line of sight azimuth, target pitch and aspect angles, and wind speed. The weapon or aircraft firing condition parameters may include, but are not limited to relative velocities and directions of travel of the launch aircraft and the target and those of the weapon relative to the target.

Once the LAR, LSZ, or MEZ has been reconstructed for a particular engagement by the LAR/LSZ generation module 76, the LAR/LSZ generation module 76 sends the reconstructed LAR, LSZ, or MEZ back to the output manager for the next stage in the schedule, such as the LAR/LSZ check module 80.

The look-up table module 78 comprises the same generic look-up table algorithm 27 as the look-up table data generator 25. In this embodiment, the look-up table module 78 receives the modified configuration data for the generic look-up table algorithm 27 from the output manager 74. The look-up table module 78 brings together the generic look-up table algorithm 27 and the uploaded configuration data so as to reconstruct the specific look-up table algorithm specified by that set of configuration data. The look-up table module 78 then implements the reconstructed specific look-up table algorithm for the current engagement using the current launch conditions (i.e. the weapon or aircraft firing conditions/parameters). An output of the look-up table module 78 may, for example, include data that is useful to pilot 1 in the current engagement. An output of the look-up table module 78 may include data that is to be used by one or more of other aircraft systems or subsystems, for example, the LAR/LSZ generation module 76 and/or the LAR/LSZ check module 80, and/or may generate intermediate results used by subsequent steps in the output manager's schedule.

The LAR/LSZ check module 80 comprises the same generic LAR/LSZ check algorithm 31 as the LAR/LSZ check data generator 29. In this embodiment, the LAR/LSZ check module 80 receives the modified configuration data for the generic LAR/LSZ check algorithm 31 from the output manager 74. The LAR/LSZ check module 80 brings together the generic LAR/LSZ check algorithm 31 and the uploaded configuration data so as to reconstruct the specific LAR/LSZ check algorithm specified by that set of configuration data. The LAR/LSZ check module 80 then implements the reconstructed specific LAR/LSZ check algorithm to check the LAR, LSZ, or MEZ that has been generated by the LAR/LSZ generation module 76. The reconstructed specific LAR/LSZ check algorithm performed by the LAR/LSZ check module 80 may also check one or more of the outputs generated by the look-up table module 78, the order of processing and the flow of data being, in this embodiment, entirely dictated by the output manager's schedule (as defined in its configuration data).

In this embodiment, the specific LAR/LSZ check algorithm implemented by the LAR/LSZ check module 80 includes one or more rules and/or test criteria against which the LAR, LSZ, or MEZ is assessed.

In this embodiment, if a test criterion of the specific LAR/LSZ check algorithm is not satisfied by the LAR, LSZ, or MEZ, the LAR/LSZ check module 80 modifies the LAR, LSZ, or MEZ so as to satisfy that criterion. For example, if the LAR/LSZ check module 80 determines that $R_{max} < R_{min}$, then the LAR/LSZ check module 80 may set $R_{max} = R_{min}$. In some embodiments, the specific LAR/LSZ check algorithm does not modify the LAR, LSZ, or MEZ so as to satisfy previously unsatisfied criteria. For example, in some embodiments, if a test criterion of the specific LAR/LSZ check algorithm is not satisfied by the LAR, LSZ, or MEZ, the LAR/LSZ check module 80 may output the unmodified LAR, LSZ, or MEZ. In some embodiments, if one or more test criteria are not satisfied by the LAR, LSZ, or MEZ tested by the LAR/LSZ check module 80, an indication of the criterion or criteria that was not satisfied is output by the LAR/LSZ check module 80. This indication may be used by another system, for example, this indication may be displayed to the pilot and/or used by the LAR/LSZ generation module 76 for improving the LAR/LSZ/MEZ reconstruction process.

In some cases, the check may indicate that the LAR/LSZ is empty, i.e. no firing solution exists. In such cases the check may provide an indication to the pilot of the manoeuvre required to improve the aircraft firing conditions.

Thus, a data-configurable algorithm is used to perform consistency checks on the outputs of other data-configurable algorithms.

In this embodiment, the LAR, LSZ, or MEZ output by the LAR/LSZ check module 80 is sent, by the LAR/LSZ check module 80, to the display 72 where it is displayed to the pilot.

In this embodiment, in operation, when the launch aircraft 1 engages with a hostile target aircraft T, the reconstructor 70 on board the launch aircraft 1 may select, from the uploaded configuration data, for each of the modules of the reconstructor 70 (i.e. for the output manager 74, the LAR/LSZ generation module 76, the look-up table module 78, and the LAR/LSZ check module 80), those configuration data that correspond to the weapon being carried by the launch aircraft 1 and that correspond to the relevant firing condition (altitude, angle of attack, environmental conditions, speed etc.). The selected configuration data may then be used to reconstruct the LSZ of the launch aircraft 1 for display to the pilot of the launch aircraft 1. The selected configuration data may also be used to modify that reconstructed LSZ so that it fulfils one or more engagement-dependent criteria, prior to its display to the pilot. The reconstructed LSZ of the launch aircraft 1 may also be used by other systems on board the launch aircraft 1 to recommend actions to the pilot of the launch aircraft 1 (e.g. a recommendation that the weapon is fired etc.).

Also when the launch aircraft 1 engages with a hostile target aircraft T, the aircraft type of the hostile target T may be determined by the pilot of the launch aircraft 1 (or by other means) and input to the reconstructor 70. The reconstructor 70 on board the launch aircraft 1 may then select, from the uploaded configuration data, for each of the modules of the reconstructor 70, those configuration data that correspond to the weapon most likely being carried by the hostile target T and that correspond to the relevant firing conditions. The selected configuration data may then be used to reconstruct the LSZ of the hostile target T for display to the pilot of the launch aircraft 1. The selected configuration data may also be used to modify that reconstructed LSZ so that it fulfils one or more engagement-dependent criteria, prior to its display to the pilot. The reconstructed LSZ of the hostile target T may also be used by other systems on board the launch aircraft 1 to recommend actions to the pilot of the launch aircraft 1 (e.g. a recommendation that certain evasive manoeuvres are performed etc.).

In this embodiment, in operation, when the launch aircraft 1 engages with a hostile ground target 5, the reconstructor 70 on-board the launch aircraft 1 may select, from the uploaded configuration data, for each of the modules of the reconstructor 70, those configuration data that correspond to the weapon being carried by the launch aircraft 1 and that correspond to the relevant firing condition (altitude, angle of attack, environmental conditions, speed, etc.). The selected configuration data may then be used to reconstruct the LAR of the launch aircraft 1 for display to the pilot of the launch aircraft 1. The selected configuration data may also be used to modify that reconstructed LAR so that it fulfils one or more engagement-dependent criteria, prior to its display to the pilot. The reconstructed LAR of the launch aircraft 1 may also be used by other systems on board the launch aircraft 1 to recommend actions to the pilot of the launch aircraft 1 (e.g. a recommendation that the weapon is fired etc.).

Also when the launch aircraft 1 engages with a hostile ground target 5, the type of the ground target 5 may be determined by the pilot of the launch aircraft 1 (or by other means) and input to the reconstructor 70. The reconstructor 70 on board the launch aircraft 1 may then select, from the uploaded configuration data, for each of the modules of the reconstructor 70, those configuration data that correspond to the weapon most likely being carried by the ground target 5 and that correspond to the relevant firing conditions. The selected configuration data may then be used to reconstruct the MEZ of the ground target 5 for display to the pilot of the launch aircraft 1. The selected configuration data may also be used to modify that reconstructed MEZ so that it fulfils one or more engagement-dependent criteria, prior to its display to the pilot. The reconstructed MEZ of the ground target 5 may also be used by other systems on board the launch aircraft 1 to recommend actions to the pilot of the launch aircraft 1 (e.g. a recommendation that certain evasive manoeuvres are performed etc.).

In the present invention, a single algorithm allows the rapid change between different weapons payloads simply by uploading a set of data representing the coefficients applicable to the new weapon.

Apparatus, including the any of the above mentioned data processors, for implementing the above described arrangement, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Advantageously, the above described generic algorithms (e.g. the generic polynomial for producing the LAR, LSZ or MEZ and the generic check algorithm) may be used (e.g. simultaneously) by multiple different types of aircraft. In other words, different types of aircraft may use the same generic LAR/LSZ algorithm to calculate LARs/LSZs. Also, the same generic LAR/LSZ algorithm may be used to calculate LARs/LSZs for different weapon types. Thus, aircraft software comprising the generic algorithms and means for allowing loading of configuration data for each weapon loaded on aircraft is produced only once. The software algorithm and configuration data, for any given weapon, are the same for any aircraft type. This tends to be different to conventional methodologies in which, although common tools may be used for polynomial and coefficient generation, both the software (including an algorithm/polynomial) and coefficients are generated for every weapon type and every time the weapon performance is changed. This need to rewrite the software and the certification of it tends to be particularly costly. The above described method and system advantageously tend to provide that the aircraft software does not have to be rewritten and hence no new certification is required.

The set of generic algorithms may advantageously be adapted through pre-defined configuration data to alter their function or performance. For example, as described above a standard form of polynomial algorithm is used to provide pilot indications of expected weapon performance derived in real-time from aircraft and sensor inputs. The configuration data adapts the generic algorithm to reflect the performance of the aircraft, sensors and weapon type. Upgrades to any of these components will affect overall weapon system performance. The above described system and method tends to allow the benefit of these upgrades to be realised without the costly and expensive process of software update and re-test.

The configuration data can be large and complex, and may contain many hundreds of parameters that are strongly inter-related. The above described system and method advantageously provides that this data is prepared, tested and then loaded into the operational system.

Advantageously, an architecture for a data-configurable system with strong separation between fixed and configurable aspects of the system is provided. The functions of the generic algorithms, and also the selection of the algorithms themselves, are data-configurable.

Advantageously, a data-configurable algorithm is implemented to configure the execution order, input and output of the other algorithms.

In the above system and methods, data may be defined offline as a set of static constants. Thus, the use of dynamic programming structures with their inherent verification difficulties tends to be reduced (e.g. minimised) or eliminated.

In the above described system and methods, the ability to locate and relocate configuration data in memory tends to be provided. Data tends to be stored efficiently, avoiding wastage of data storage and minimising the size of data files.

Advantageously, a need for an operating system on board the launch aircraft for managing configuration data sets tends to be reduced or eliminated. Thus, cost and on board computational power tend to be reduced. The above described system and methods use a very simple data interface, simple algorithms, are self-contained and are independent of the computing platform and programming language used.

Configuration data consistency checks are advantageously performed using the inherent capabilities of the programming language.

The use of efficient data-loading mechanisms that do not rely on file systems or complex parsers tend to be provided.

The use of generic algorithms advantageously tends to avoid the need to develop and maintain dedicated input/output functions for the configuration data of each embedded algorithm. This tends to avoid sources of error where the generic algorithms and their I/O capabilities become inconsistent during modification/upgrade.

In some embodiments, each aircraft within a fleet comprising a plurality of different aircraft is loaded with the same, common generic algorithms. When a weapon is loaded onto an aircraft in the fleet, the specific configuration data corresponding to that weapon may also be loaded onto that aircraft. This tends to be in contrast to conventional systems in which, although the tools for generating LAR/LSZs may be common across multiple different aircraft, when a weapon is loaded onto an aircraft, both a polynomial/algorithm and corresponding coefficients for generating LAR/LSZs are generated for that aircraft and weapon loadout.

In the above embodiments, a plurality of generic algorithms is implemented, namely the generic LAR/LSZ algorithm, the generic look-up table algorithm, the generic LAR/LSZ check algorithm, and the generic output manager algorithm. Advantageously, the above described reconstructor is extensible. Thus, in other embodiments, one or more of these generic algorithms may be omitted, for example, in some embodiments, the generic look-up table algorithm may be omitted. Also, in some embodiments, one or more different generic algorithms may be implemented instead of or in addition to one or more of the generic LAR/LSZ algorithm, the generic look-up table algorithm, the generic LAR/LSZ check algorithm, and the generic output manager algorithm. In embodiments in which a different generic algorithm is implemented, the ground system 11 may include a generator for generating configuration data for that different generic algorithm. Also, the reconstructor on the aircraft may comprise a copy of that different generic algorithm and may be configured to receive and process the configuration data for that different generic algorithm so as to reconstruct the specific form of that different generic algorithm specified by that configuration data. That specific form of the different generic algorithm may be implemented on board the launch aircraft, e.g. using aircraft data, to produce an output that may be, for example, used by an aircraft subsystem or displayed to the aircraft pilot.

In the above embodiments, data processors and storage devices are distributed between a ground location and the launch aircraft as described above. However, in other embodiments, one or more of the data processors or storage devices that, in the above embodiments, is located on the ground, is instead located on the launch aircraft. Similarly, in some embodiments, one or more of the data processors or storage devices that, in the above embodiments, is located on the launch aircraft, may instead be located on the ground such as within a pilot training system.

The invention claimed is:

1. A data processing method comprising:
storing, at a first memory location in a memory, a first copy of a set of data;
storing, at a second memory location in a memory, a second copy of the set of data;
comparing the first copy to the second copy so as to identify, within the first copy, a pointer, the pointer being located at a first data element of the first copy, the pointer specifying a second data element of the first copy;

determining an offset for the identified pointer, the offset specifying a number of data elements between the first data element and the second data element; and modifying the first copy such that the pointer within the first copy specifies the second data element using only the first data element and the offset.

2. The method according to claim 1, the method further comprising:

determining the set of data using a generic algorithm, the set of data being configuration data for the generic algorithm;

uploading the modified first copy of the data set to an aircraft;

determining, on board the aircraft, using the same generic algorithm and the uploaded modified first copy of the data set, a specific algorithm; and performing, on board the aircraft, the specific algorithm.

3. The method according to claim 2, wherein the step of determining the specific algorithm comprises selecting, according to aircraft conditions, from the modified first copy of the data set, data for configuring the generic algorithm.

4. The method according claim 2, wherein:

the generic algorithm includes a generic polynomial; and the method further comprises:

providing a weapon performance envelope for a weapon;

determining, using the weapon performance envelope, the set of data, the set of data including coefficients for the generic polynomial; and determining, on the aircraft, using the same generic polynomial and the coefficients specified in the uploaded modified first copy of the data set, feasibility data indicative of the feasibility of the weapon carried on the aircraft successfully engaging a target and/or the feasibility of the weapon carried on the target successfully engaging the aircraft.

5. The method according to claim 4, wherein the step of determining, using the weapon performance envelope, the set of data comprises:

acquiring a respective performance envelope for one or more different types of aircraft;

using the one or more aircraft performance envelopes, determining a performance envelope defining the performance of all of the different aircraft types;

using the weapon performance envelope and the performance envelope that is representative of the performance of all of the different aircraft types, determining a further performance envelope, the further performance envelope defining the weapon's performance when that weapon is implemented on each of the different aircraft types, the further performance envelope being the minimum envelope that defines the weapon's performance when that weapon is implemented on each of the different aircraft types; and determining the set of data, the set of data including the coefficients for the generic polynomial that fit the generic polynomial to the further performance envelope.

6. The method according to claim 4, the method including, using aircraft and target conditions, and the determined feasibility data, displaying, on the aircraft, a feasibility display indicative of the feasibility of a weapon carried on the aircraft successfully engaging a target and/or the feasibility of a weapon carried on the target successfully engaging the aircraft.

7. The method according to claim 2, wherein:

the specific algorithm specifies one or one or more test criteria;

the method further comprising:

providing a weapon performance envelope for a weapon;

determining, using the weapon performance envelope, the set of data;

generating feasibility data indicative of the feasibility of the weapon carried on the aircraft successfully engaging a target and/or the feasibility of the weapon carried on the target successfully engaging the aircraft; and performing, on board the aircraft, an assessment process including determining whether or not the feasibility data satisfies the one or one or more test criteria.

8. The method according to claim 7, the method further comprising, based on a result of the assessment process, using the feasibility data, generating, on the aircraft, a feasibility display indicative of the feasibility of a weapon carried on the aircraft successfully engaging a target and/or the feasibility of a weapon carried on the target successfully engaging the aircraft.

9. The method according to claim 8, wherein the step of determining the specific algorithm comprises selecting, from the uploaded modified first copy of the data set, data for configuring the generic algorithm in order to generate the one or more test criteria.

10. The method according to claim 9, wherein the step of selecting data for configuring the generic algorithm in order to generate the one or more test criteria is performed according to aircraft and target conditions.

11. The method according to claim 2, wherein:

the specific algorithm specifies a schedule; and the step of performing, on board the aircraft, the specific algorithm comprises performing one or more processes on the aircraft in accordance with the schedule.

12. A non-transitory storage medium comprising a program or plurality of programs arranged such that when executed by a computer system or one or more processors it/they cause the computer system or the one or more processors to operate in accordance with the method of claim 1.

13. A data processing apparatus comprising:

a memory configured to:

store, at a first memory location, a first copy of a set of data; and store, at a second memory location, a second copy of the set of data;

a comparator operatively coupled to the memory and configured to compare the first copy to the second copy so as to identify, within the first copy, a pointer, the pointer being located at a first data element of the first copy, the pointer specifying a second data element of the first copy;

one or more processors configured to determine an offset for the pointer, the offset specifying a number of data elements between the first data element and the second data element; and a data modification module configured to modify the first copy such that the pointer within the first copy specifies the second data element using only the first data element and the offset.

14. The apparatus according to claim 13 further comprising:

a first generator configured to generate a database describing a weapon performance envelope;

a second generator configured to generate, using the weapon performance envelope and a generic algorithm, the set of data, the set of data being configuration data for configuring the generic algorithm; and an uploader configured to upload the modified first copy of the data set to an aircraft.

\* \* \* \* \*